(12) United States Patent
Voronkov et al.

(10) Patent No.: US 9,721,309 B2
(45) Date of Patent: Aug. 1, 2017

(54) RANKING OF DISCUSSION THREADS IN A QUESTION-AND-ANSWER FORUM

(71) Applicant: Microsoft Corporation, Redmond, WA (US)

(72) Inventors: Nikita Voronkov, Bothell, WA (US); Dmitriy Meyerzon, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 188 days.

(21) Appl. No.: 14/145,803

(22) Filed: Dec. 31, 2013

(65) Prior Publication Data

US 2015/0186379 A1  Jul. 2, 2015

(51) Int. Cl.
G06F 17/30 (2006.01)
G06Q 50/00 (2012.01)
G06Q 10/10 (2012.01)

(52) U.S. Cl.
CPC ........... *G06Q 50/01* (2013.01); *G06Q 10/107* (2013.01)

(58) Field of Classification Search
CPC .................. G06F 17/3053; G06F 17/30707
See application file for complete search history.

(56) References Cited

U.S. PATENT DOCUMENTS

| | | | |
|---|---|---|---|
| 7,437,382 B2 | 10/2008 | Zhang et al. | |
| 7,933,864 B1 * | 4/2011 | King | G06Q 30/018 707/608 |
| 8,346,701 B2 | 1/2013 | Wang et al. | |
| 8,402,021 B2 | 3/2013 | Nad et al. | |
| 8,560,530 B2 | 10/2013 | Krichman et al. | |
| 2006/0112036 A1 * | 5/2006 | Zhang | G06F 17/30707 706/20 |
| 2007/0038622 A1 | 2/2007 | Meyerzon et al. | |
| 2008/0046394 A1 * | 2/2008 | Zhou | G06F 17/30705 706/52 |
| 2008/0082607 A1 | 4/2008 | Sastry et al. | |
| 2008/0215541 A1 * | 9/2008 | Li | G06F 17/30864 |
| 2009/0106221 A1 | 4/2009 | Meyerzon et al. | |

(Continued)

OTHER PUBLICATIONS

International Search Report and Written Opinion Received for PCT Patent Application No. PCT/US2014/069865, mailed Apr. 14, 2015, 10 Pages.

(Continued)

*Primary Examiner* — Dinku Gebresenbet
(74) *Attorney, Agent, or Firm* — Perkins Coie LLP (57) ABSTRACT

A system for scoring a discussion thread having posts in a question-and-answer form is provided. The system receives a query and then identifies features of the discussion thread that may include one or more term features and one or more non-term features. A term feature may be a combined post feature that combines the terms of multiple posts to treat them as a single document. A term feature may be a question feature that contains the question of the discussion thread. A term feature may also be a question post feature that contains the terms of the post that relate to the question of the post. The system then generates a feature score for each feature and combines the feature scores into a relevance score indicating the relevance of the discussion thread to the query. The system may also use the relevance score when ranking discussion threads.

24 Claims, 6 Drawing Sheets

(56) References Cited

U.S. PATENT DOCUMENTS

| | | | |
|---|---|---|---|
| 2010/0030753 A1* | 2/2010 | Nad | G06F 17/30864 707/722 |
| 2010/0205168 A1 | 8/2010 | Yang et al. | |
| 2013/0007037 A1 | 1/2013 | Azzam et al. | |
| 2013/0086030 A1 | 4/2013 | De Filippi | |
| 2013/0097178 A1 | 4/2013 | Song et al. | |
| 2013/0138671 A1* | 5/2013 | Cleaver | G06Q 10/101 707/758 |
| 2013/0262453 A1 | 10/2013 | Lin et al. | |

OTHER PUBLICATIONS

Dalip, et al., "Exploiting User Feedback to Learn to Rank Answers in Q&A Forums: A Case Study with Stack Overflow", In Proceedings of the 36th International ACM SIGIR Conference on Research and Development in Information Retrieval, Jul. 28, 2013, 10 pages.

Jeon, et al., "A Framework to Predict the Quality of Answers with Non-Textual Features", In Proceedings of the International Conference on Research and Development in Information Retrieval, Aug. 6, 2006, 8 pages.

Tu, et al., "Analogical Reasoning for Answer Ranking in Social Question Answering", In IEEE Intelligent Systems, vol. 27, Issue 5, Sep. 2012, 8 pages.

"Customizing Ranking Models to Improve Relevance in Sharepoint", Aug. 13, 2013, Available at: http://msdn.microsoft.com/en-us/library/sharepoint/dn169052.aspx.

Second Written Opinion Issued in PCT Application No. PCT/US2014/069865, mailed: Oct. 15, 2015, 7 Pages.

International Preliminary Report on Patentability Issued in PCT Application No. PCT/US2014/069865, Mailed Date: Apr. 6, 2016, 8 Pages.

\* cited by examiner

RANKING OF DISCUSSION THREADS IN A QUESTION-AND-ANSWER FORUM

BACKGROUND

Many search engine services, such as Google and Bing, provide for searching for information that is accessible via the Internet. These search engine services allow users to search for display pages, such as web pages, that may be of interest to users. After a user submits a search request (also referred to as a "query") that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of base web pages to identify all web pages that are accessible through those base web pages. The keywords of any particular web page can be identified using various well-known techniques, such as identifying the words of a headline, the words supplied in the metadata of the web page, the words that are highlighted, and so on. The search engine service may generate a relevance score to indicate how related the information of the web page may be to the search request. The search engine service then displays to the user links to those web pages in an order that is based on their relevance.

Discussion threads are a popular way for people to communicate using the Internet. A particular popular type of discussion thread service is a web forum. A web forum is a web site that allows users of the web site to post information that is available to be viewed by other users of the web site. A discussion thread, such as a newsgroup, allows people to participate in a discussion about a specific topic. A discussion thread is typically initiated when a person creates an initial message directed to a topic and posts the message as a new discussion thread. Other persons can read the initial message and post response messages to the discussion thread. For example, the initial message may pose a question such as "Has anyone encountered a situation where the Acme software product aborts with error number 456?" Persons who want to participate in the discussion can post response messages such as "It happens to me all the time" or "I fixed the problem by reinstalling the software."

A question-and-answer (Q&A) forum are tailored to such discussion threads that start with a question and may include one or more answers representing a Q&A form of a discussion thread. For example, a customer support group within a company that sells a certain software product may provide a Q&A for its customers to create and participate in discussion threads relating to the software product. A customer may initiate a discussion thread by posting an initial message that poses a question such as the one mentioned above. That question may be answered by the posting of a response message by another customer or a customer service representative. When posting answers to the question, each poster may designate that posting as having a suggested answer. Since the knowledge of the posters can vary significantly, a suggested answer may be wrong. A forum administrator may review the suggested answers and mark one or more postings as having a verified answer—that is, verified to be a correct answer. Also, a Q&A forum may have different discussion threads that are directed to essentially the same initial question. To assist customers in picking a discussion thread that provides the best discussion relating to the initial question, the forum administrator may designate some of those discussion threads as important.

The corpus of discussion threads of the company may provide a vast amount of knowledge related to problems and concerns that customers may encounter along with appropriate responses (e.g., answers to questions posed). The company may allow customers to search the corpus of discussion threads using a general-purpose search engine. A customer typically inputs a question in search of its answer. Such a general-purpose search engine, however, may not rank the search results in an order that is particularly helpful. For example, such a general-purpose search engine may rank a web page for the posting that contains the same question as its initial question relatively high and rank a web page for the posting that contains only the answer, but not the question, relatively low.

SUMMARY

A method and system for scoring a discussion thread having posts in a question-and-answer form is provided. The system receives a query and then identifies features of the discussion thread that may include one or more term features and one or more non-term features. A term feature may be a combined post feature that combines the terms of multiple posts of a discussion thread to treat them as a single document. A term feature may be a question feature that contains the question of the discussion thread (e.g., the subject of the first post of the discussion thread). A term feature may also be a question post feature that contains the terms of the post that relate to the question of the post (e.g., the text of the first post of the discussion thread). A non-term feature may be an answer feature, a popularity feature, an authority feature, an importance feature, or a clickthrough feature. The system then generates a feature score for each feature and combines the feature scores into a relevance score indicating the relevance of the discussion thread to the query. The system may also use the relevance score when ranking discussion threads.

DETAILED DESCRIPTION

A method and system for ranking discussion threads having posts in a question-and-answer form is provided. In some embodiments, a Q&A ranking system receives a query and generates relevance scores for discussion threads indicating relevance of the discussion threads to the query. To generate a relevance score for a discussion thread, the Q&A ranking system extracts features from each discussion thread and generates a feature score for each feature. For example, the features may include term features such as a question feature (e.g., the subject of the first post of the discussion thread), a question post feature (e.g., the text of the first post of the discussion thread), and a combined post feature. The features may also include one or more non-term features such as an answer feature, a popularity feature, an authority feature, an importance feature, and a clickthrough feature, which are described below. The Q&A ranking system then combines the feature scores for a discussion thread to generate the relevance score. The Q&A ranking system may weight the feature scores using feature weights learned via a machine learning algorithm (e.g., neural network or adaptive boosting) using training data derived from a Q&A forum. In the following, the term features and the non-term features are described as contributing to the relevance of a discussion thread to a query. Alternatively, the term features without the non-term features could be considered as determining the relevance of the content of the term features to the query, and the non-term features could be considered as indicating overall relevance of a discussion thread regardless of the content of the posts. For example, a discussion thread with a verified answer is more likely to be relevant regardless of its content.

In some embodiments, the term features are derived from the terms of the discussion thread for comparison to the terms of the query. The question feature represents the primary question of the discussion thread. The primary question may be the question initially posed when the discussion thread was started. For example, the subject of the initial post of the discussion thread may contain the question. Alternatively, a Q&A forum may maintain a question field for storing the primary question of a discussion thread. The question feature may contain all the words of the question, only keywords of the question, only non-noise words of the question, and so on. The question post feature represents the terms of the post of the discussion thread that relates to the posting of the question such as the initial post of the discussion thread. The initial post of the discussion thread may contain the question as its subject or may relate to the question that may be posed in a question field outside of the initial post. The question post feature may contain all the terms of the post or may contain just the terms of the body of the post (e.g., excluding the question that is stored in the subject of the post). The question post feature may also represent other posts of the poster of the initial post because the poster may have clarified the question in subsequent posts. The question feature and the question post feature may be considered question-based features because they relate to the question of the post. The combined post feature represents a combining of the terms of posts of a discussion thread into a single document. The combined post feature may include the terms from all of the posts of the discussion thread, all the posts except the question post, or selected posts of the discussion thread. For example, the posts may be selected based on recency of the post, whether the post has an answer, and so on.

The use of separate term features for the question, the question post, and the combined post has several advantages. For example, the separating of the question from the question post allows the relevance to the query of the question to be assessed separately from the relevance to the query of the discussion of the question. Also, the combining of multiple posts into the combined post feature allows the relevance of the overall discussion thread to the query to be assessed rather than just the relevance of individual posts of the discussion thread. The separating of the question post from the combined post allows the relevance to the query of the poster's initial comments to be assessed separately from the subsequent posts. Even though the term features are considered separate features, the Q&A ranking system may generate a combined feature score for all three term features that is based on a weighted summation of a combined post feature score, a question post feature score, and a question feature score.

In some embodiments, the non-term features allow the relevance of a discussion thread to the query to factor in criteria other than just the terms of the query and the discussion thread. The answer feature is derived from metadata of the posts of a discussion thread indicating whether the post has an answer. A post may have a suggested answer as indicated by the poster and/or a verified answer as indicated by an administrator. A discussion thread with a verified answer may be considered more relevant than a discussion thread with just a suggested answer, which may be considered more relevant than a discussion thread with no answer. The popularity feature represents the popularity of a discussion thread and may be derived from the number of times that a discussion thread has been viewed. A popular discussion thread may be considered more relevant than an unpopular discussion thread. The authority feature represents the authority of a poster of an answer. The authority indicates the quality of the answers given by a poster in other discussion threads and may be determined based on the number of answers given by the poster that have been verified. A discussion thread with an answer by a poster who frequently gives verified answers may be considered more relevant than a discussion thread with an answer from a poster with no verified answers. The importance feature represents the importance of a discussion thread relative to other discussion threads in a forum and may be indicated by an administrator. Some Q&A forums allow an administrator to designate the importance of a discussion thread. A discussion thread with a high importance may be considered more relevant than a discussion thread with a low importance. The clickthrough feature is derived from clickthrough data indicating when users have selected or clicked through a discussion thread from search results. The clickthrough data may be a count of the number of times a discussion thread has been clicked through. The clickthrough data may be provided by the Q&A forum itself (e.g., an internal clickthrough feature) and/or may be provided by an external search engine (e.g., an external clickthrough feature). A discussion thread with a high clickthrough count is considered more relevant than a discussion thread with a low clickthrough count.

The Q&A ranking system may generate a relevance score indicating relevance of a discussion thread to a query according to the following equation:

$$RS = \sum_i w_i FS_i \qquad (1)$$

where RS represents the relevance score, $FS_i$ represents the feature score for feature i, and $w_i$ represents the weight for feature i. The weights may be learned using a machine learning algorithm and may represent a non-linear combination of feature scores such as a neural network or a set of weighted trees. The Q&A ranking system may generate a combined feature score for the term features according to the following equation:

$$FS_{TF} = \sum_{t} TF'_t \log\left(\frac{N}{n}\right) \quad (2)$$

where t represents a term of the query, $TF_t'$ represents a sub-score for term t, N represents the number of discussion threads, and n represents the number of discussion threads that contain term t. Equation 2 is a variation of the term-frequency-by-inverse-document-frequency (tf*idf) metric referred to as BM25F. The sub-score for a term is generated according to the following equation:

$$TF'_t = TF_{t,cp} * w_{cp} * \frac{1 + b_{cp}}{\left(\frac{DL_{cp}}{AVDL_{cp}} + b_{cp}\right)} + \\ TF_{t,q} * w_q * \frac{1 + b_q}{\left(\frac{DL_q}{AVDL_q} + b_q\right)} + TF_{t,qp} * w_{qp} * \frac{1 + b_{qp}}{\left(\frac{DL_{qp}}{AVDL_{qp}} + b_{qp}\right)} \quad (3)$$

where cp, q, and qp represent the combined post feature, the question feature, and the question post feature, respectively; $TF_{t,x}$ represents the number of times the term t appears in feature x; $DL_x$ represents the number of terms in feature x; $AVDL_x$ represents the average number of terms in feature x for all discussion threads that contain term t; and $w_x$ represents a tunable weight for feature x.

The answer feature may have a feature score $FS_a$ represented by the following equation:

$$FS_a = \begin{cases} v_0 & \text{if the discussion thread has no answwer} \\ v_1 & \text{if the discussion thread has a suggested answer, but no verified answer} \\ v_2 & \text{if the discussion thread has a verified answer, but no suggested answer} \\ v_3 & \text{if the discussion thread has a verified answer and a suggested answer} \end{cases} \quad (4)$$

where $v_y$ represents a tunable parameter for the condition y.

The popularity feature may have a feature score $FS_p$ represented by the following equation:

$$FS_p = \begin{cases} \log(N_p + b_p), & \text{if } 0 \le N_p \le N_{max,p} \\ \log(N_{max,p} + b_p), & \text{if } N_p > N_{max,p} \end{cases} \quad (5)$$

where $N_p$ represents the number of times the discussion thread has been viewed and $N_{max,p}$, $b_p$ represent tunable parameters.

The authority feature may have a feature score $FS_{au}$ represented by the following equation:

$$FS_{au} = \frac{N_a}{N_a + k_a} \quad (6)$$

where $N_a$ represents the number of verified answers across all the discussion threads for the poster of a verified answer (or suggested answer if there is no verified answer) in the discussion thread and $k_a$ represents a tunable parameter.

The importance feature may have a feature score $FS_i$ that may be set to 1 if the discussion thread has been marked as being important and 0 otherwise. A Q&A forum may allow an administrator to set the importance to a number between, for example, 0 and 1. In such a case, the feature score $FS_i$ can take on that value.

The clickthrough feature may have a feature score $FS_c$ represented by the following equation:

$$FS_c = \begin{cases} \log(N_c + b_c), & \text{if } 0 \le N_c \le N_{max,c} \\ \log(N_{max,c} + b_c), & \text{if } N_c > N_{max,c} \end{cases} \quad (7)$$

where $N_c$ represents the number of times the discussion thread (or one of its posts) was clicked through and $M_{max,c}$, $b_c$ are tunable parameters.

Figure 1:
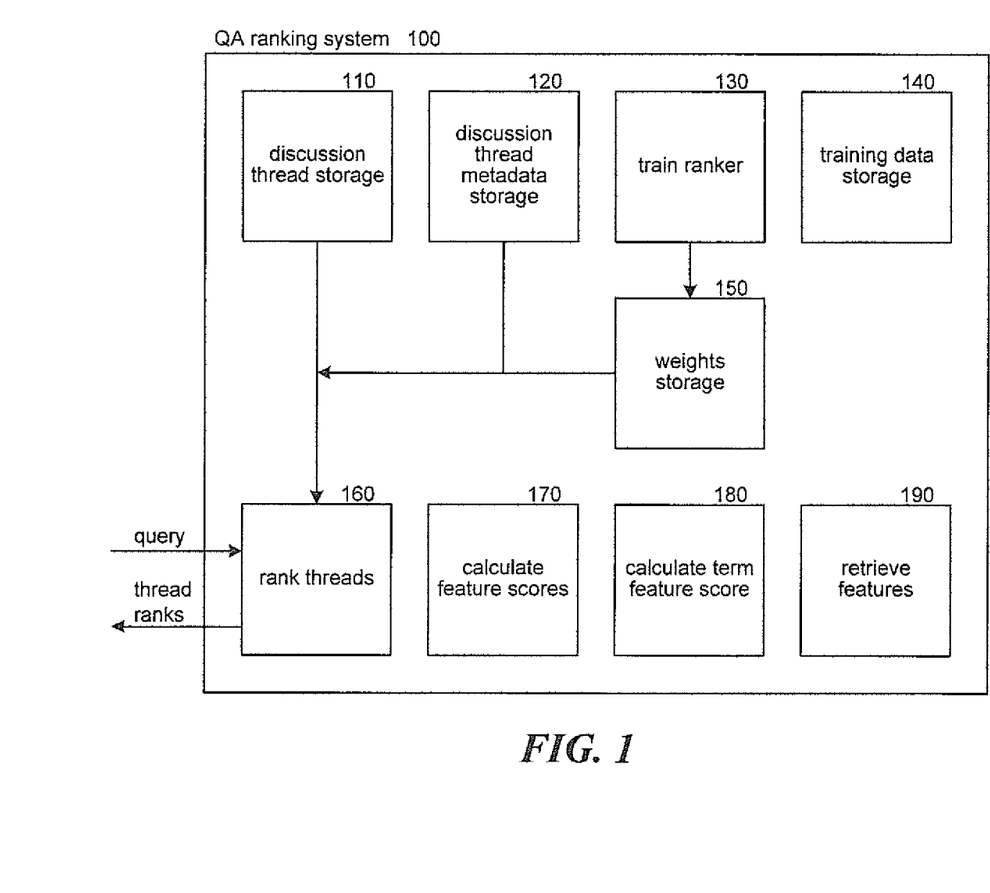
FIG. 1 is a block diagram illustrating components of the Q&A ranking system in some embodiments.

FIG. 1 is a block diagram illustrating components of the Q&A ranking system in some embodiments. The Q&A ranking system 100 may include a discussion thread storage 110 and a discussion thread metadata storage 120. The discussion thread storage contains the posts of each of the discussion threads for a Q&A forum. The discussion thread metadata storage contains metadata maintained for the discussion threads such as importance, clickthrough data, and so on. The Q&A ranking system includes a train ranker component 130 that inputs training data from a training data storage 140, learns weights for the features extracted from that training data, and stores the weights in a weights storage 150. The Q&A ranking system also includes a rank threads component 160, a calculate feature scores component 170, a calculate term feature score component 180, and a retrieve features component 190. The rank threads component inputs a query, generates a relevance score for each discussion thread, and then ranks the discussion threads based on the relevance scores. The calculate feature scores component generates the feature score for a discussion thread for a query. The calculate term feature score component generates a term feature score for a discussion thread for a query. The retrieve features component extracts the term and non-term features.

The computing devices and systems on which the Q&A ranking system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that includes computer-readable storage media and data transmission media. The computer-readable storage media are tangible storage means that do not include a transitory, propagating signal. Examples of computer-readable storage media include memory such as primary memory, cache memory, and secondary memory (e.g., DVD) and include other storage means. The computer-readable storage media may have recorded upon or may be encoded with computer-executable instructions or logic that implements the Q&A ranking system. The data transmission media is used for transmitting data via transitory, propagating signals or carrier waves (e.g., electromagnetism) via a wired or wireless connection.

The Q&A ranking system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the Q&A ranking system may be implemented in hardware using, for example, an application-specific integrated circuit ("ASIC").

Figure 2:
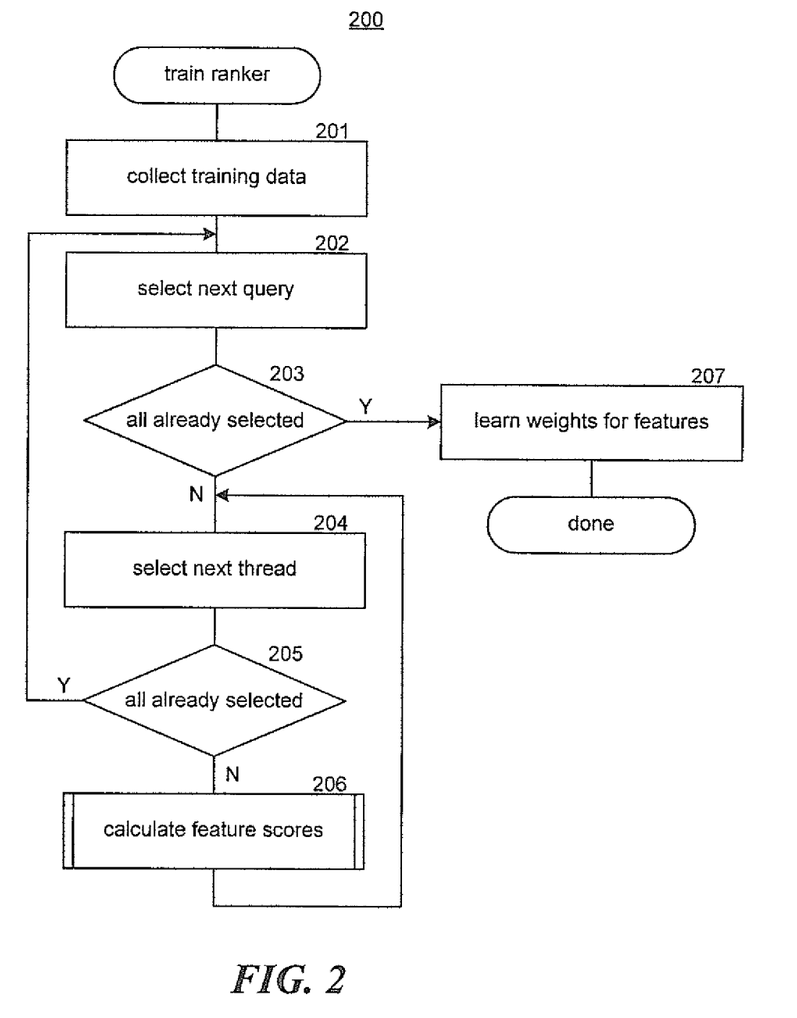
FIG. 2 is a flow diagram that illustrates the processing of a train ranker component of the Q&A ranking system in some embodiments.

FIG. 2 is a flow diagram that illustrates the processing of a train ranker component of the Q&A ranking system in some embodiments. The train ranker component 200 inputs training data that may include discussion threads (and associated metadata), queries, and labels for each query indicating the desired ranking of each discussion thread for that query. The component learns the weights for the features using any one of a variety of machine learning techniques and stores the weights in the weights storage. In block 201, the component collects the training data. The training data may be collected by requesting users to manually rank the discussion threads for each query. In blocks 202-206, the component loops calculating the feature scores for each discussion thread for each query. In block 202, the component selects the next query in the training data. In decision block 203, if all the queries have already been selected, then the component continues at block 207, else the component continues at block 204. In block 204, the component selects the next discussion thread. In decision block 205, if all the discussion threads have already been selected, then the component loops to block 202 to select the next query, else the component continues at block 206. In block 206, the component invokes the calculate feature scores component to calculate the feature scores and then loops to block 204 to select the next discussion thread. In block 207, the component learns the weights for the features based on the calculated feature scores and then completes. The component may learn the weights using an iterative process by adjusting the weights to improve an optimization metric (e.g., error function) using, for example, a gradient ascent method.

Figure 3:
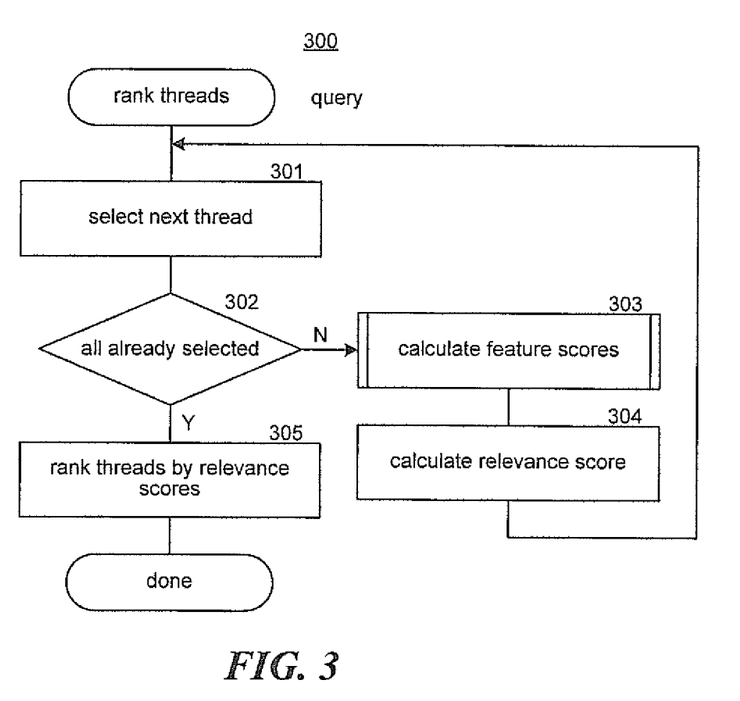
FIG. 3 is a flow diagram that illustrates the processing of a rank threads component of the Q&A ranking system in some embodiments.

FIG. 3 is a flow diagram that illustrates the processing of a rank threads component of the Q&A ranking system in some embodiments. The rank threads component 300 is passed a query and ranks the discussion threads of the discussion thread storage based on their relevance to the query. In block 301, the component selects the next discussion thread. In decision block 302, if all the discussion threads have already been selected, then the component continues at block 305, else the component continues at block 303. In block 303, the component invokes the calculate feature scores component to calculate the feature scores for the selected discussion thread. In block 304, the component calculates a relevance score for the selected discussion thread by combining the feature scores using the weights of the weights storage according to Equation 1 and then loops to block 301 to select the next discussion thread. In block 305, the component ranks the discussion threads by their relevance scores.

Figure 4:
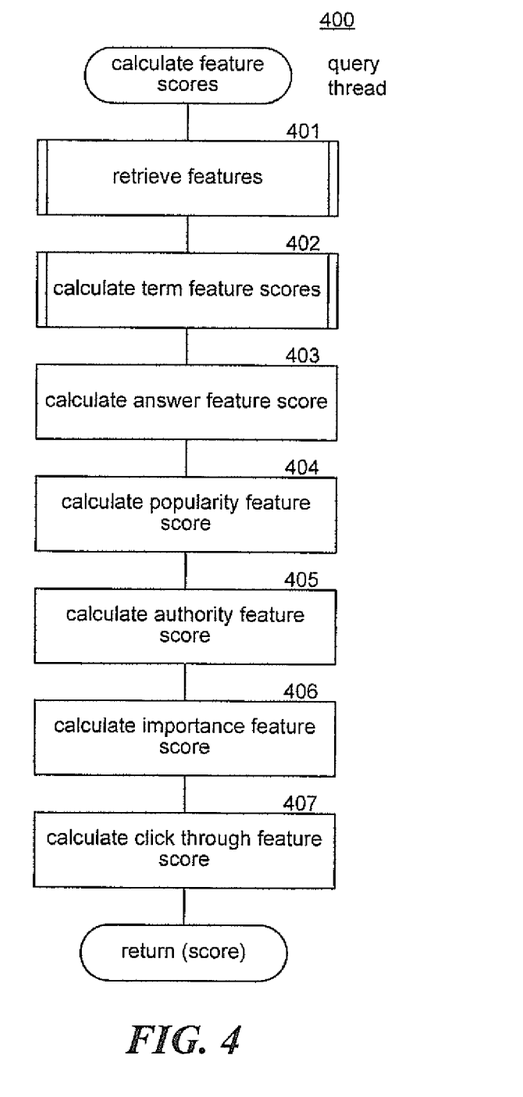
FIG. 4 is a flow diagram that illustrates the processing of a calculate feature scores component of the Q&A ranking system in some embodiments.

FIG. 4 is a flow diagram that illustrates the processing of a calculate feature scores component of the Q&A ranking system in some embodiments. The calculate feature scores component 400 is passed a query and a discussion thread and generates a feature score for each of the features of that discussion thread. In block 401, the component invokes the retrieve features component to extract the features for that discussion thread. In block 402, the component invokes the calculate term feature score component to calculate the term feature score. In block 403, the component calculates the answer feature score using Equation 4. In block 404, the component calculates the popularity feature score using Equation 5. In block 405, the component calculates the authority feature score using Equation 6. In block 406, the component calculates the importance feature score. In block 407, the component calculates the clickthrough feature score using Equation 7 and then returns the feature scores.

Figure 5:
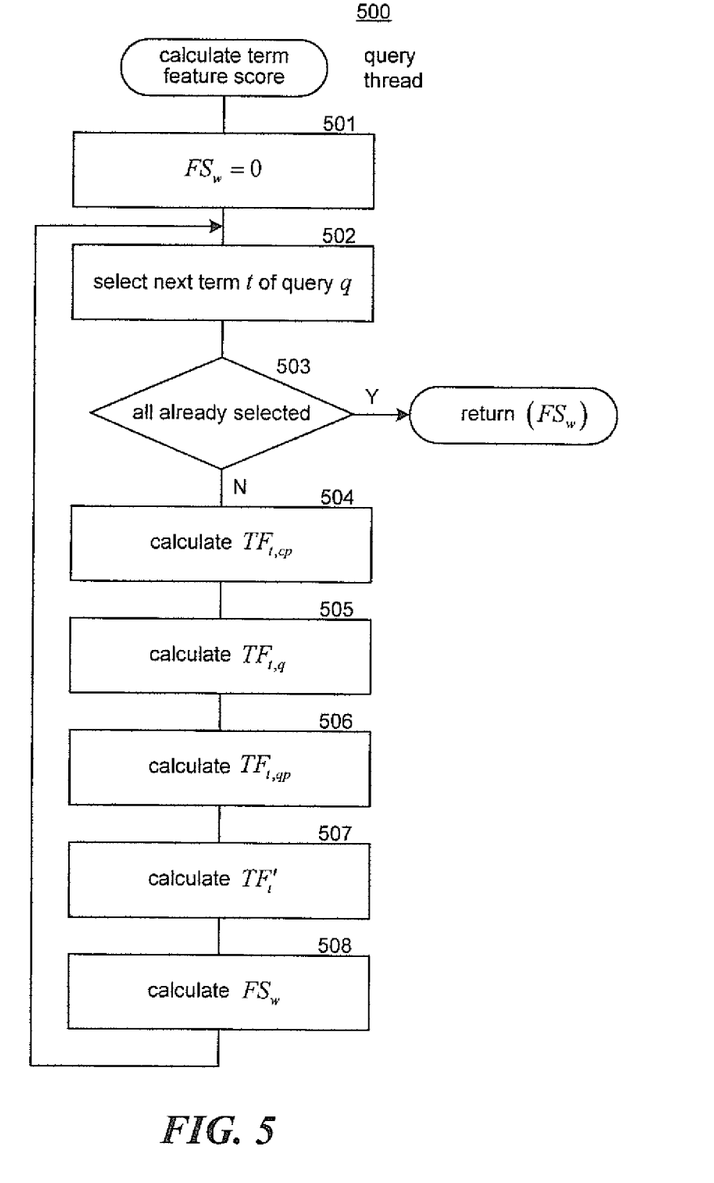
FIG. 5 is a flow diagram that illustrates the processing of a calculate term feature score component of the Q&A ranking system in some embodiments.

FIG. 5 is a flow diagram that illustrates the processing of a calculate term feature score component of the Q&A ranking system in some embodiments. The component 500 is passed a query and a discussion thread and returns the term feature score for that discussion thread for that query. In block 501, the component initializes the term feature score. In blocks 502-508, the component loops calculating a term feature sub-score for each term of the query. In block 502, the component selects the next term of the query. In decision block 503, if all the terms have already been selected, then the component returns the term feature score, else the component continues at block 504. In block 504, the component calculates the combined post feature score according to Equation 3. In block 505, the component calculates the question feature score for the selected term according to Equation 3. In block 506, the component calculates the question post feature score for the selected term according to Equation 3. In block 507, the component combines the combined post feature score, the question feature score, and the question post feature score into a combined feature score for the selected term according to Equation 3. In block 508, the component adds the combined feature score to the term feature score according to Equation 2 and then loops to block 502 to select the next term of the query.

Figure 6:
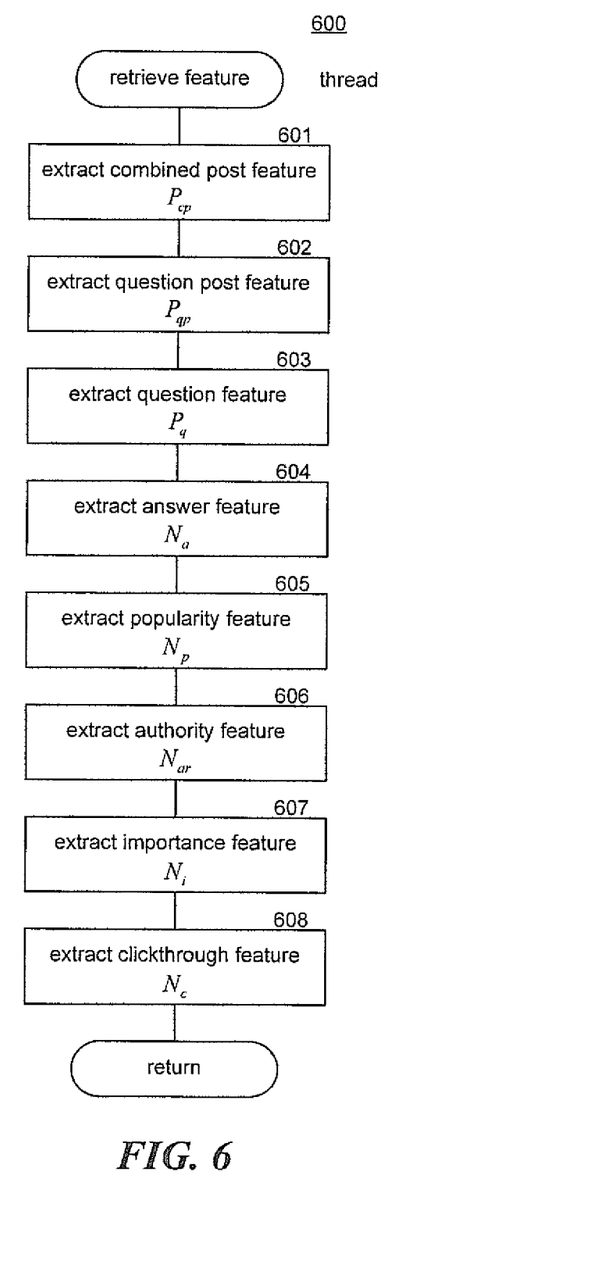
FIG. 6 is a flow diagram that illustrates the processing of a retrieve features component of the Q&A ranking system in some embodiments.

FIG. 6 is a flow diagram that illustrates the processing of a retrieve features component of the Q&A ranking system in some embodiments. The retrieve features component 600 is passed a discussion thread and extracts and returns the features. In block 601, the component extracts the combined post feature by collecting multiple posts (e.g., all the posts) of the discussion thread and combining them into a single collection or document. In block 602, the component extracts the question post feature from the body of the initial post of the discussion thread. In block 603, the component extracts the question feature from the subject of the initial post. In block 604, the component extracts the answer feature from the metadata of the discussion thread. In block 605, the component extracts the popularity feature from the metadata of the discussion thread. In block 606, the component extracts the authority feature from the metadata of the discussion thread. In block 607, the component extracts the importance feature from the metadata of the discussion thread. In block 608, the component extracts the clickthrough feature from the metadata of the discussion thread and then returns the features.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A computer-readable storage medium storing computer-executable instructions for controlling a computing system to score discussion threads in a question-and-answer form, each discussion thread having a plurality of posts with terms, the computer-executable instructions comprising:
a component that provides a query;
a component that identifies features of a discussion thread, the features including a combined post feature representing a collection of the terms of multiple posts of the plurality of posts of the discussion thread;
a component that generates feature scores for the features, the feature score for the combined post feature indicating relevance of the terms of the collection to the query;
a component that generates a relevance score for the discussion thread based on combining the feature scores for the discussion thread; and
a component that presents the relevance score as an indication of the relevance of the discussion thread to the query.

2. The computer-readable storage medium of claim 1 wherein a feature of the discussion thread is a question that is a subject of the discussion thread.

3. The computer-readable storage medium of claim 2 wherein the question is derived from a subject field of an initial post of the discussion thread.

4. The computer-readable storage medium of claim 1 wherein a feature of the discussion thread is an initial post of the discussion thread.

5. The computer-readable storage medium of claim 4 wherein the feature that is the initial post contains terms of the body of the initial post but not the terms of the subject of the initial post.

6. The computer-readable storage medium of claim 1 wherein a feature of the discussion thread is an indication of whether the discussion thread includes an answer that has been verified.

7. The computer-readable storage medium of claim 1 wherein a feature of the discussion thread is based on clickthroughs for the discussion thread.

8. The computer-readable storage medium of claim 7 wherein the clickthroughs are generated by an external search engine.

9. The computer-readable storage medium of claim 1 wherein a feature of the discussion thread is based on recency of the discussion thread.

10. The computer-readable storage medium of claim 1 wherein the component that generates the relevance score combines the feature scores using feature weights learned by applying machine learning to training data.

11. The computer-readable storage medium of claim 1 including a component that ranks the discussion threads based on their relevance scores.

12. A computing system for scoring a discussion thread based on relevance to a query, the discussion thread being in a question-and-answer form, the discussion thread having a post that is the question of the discussion thread and a plurality of posts that are answers of the discussion thread, the computing system comprising:
a computer-readable storage medium storing computer-executable instructions comprising:
instructions that identify features of the discussion thread, the features including a question-based feature that includes terms relating to the posting of the question of the discussion thread and a combined post feature representing a collection of the terms of multiple answers of the discussion thread;
instructions that generate feature scores for the features, wherein the feature score for the question-based feature indicates relevance of the terms relating to the posting of the question of the discussion thread to the query and the feature score for the combined post feature indicates relevance of the terms of the collection to the query; and
instructions that generate a relevance score for the discussion thread based on combining the feature scores for the discussion thread; and
a processor that executes the computer-executable instructions stored by the computer-readable storage medium.

13. The computing system of claim 12 wherein the question-based feature of the discussion thread is a question feature.

14. The computing system of claim 13 wherein the question feature is derived from a subject field of an initial post of the discussion thread.

15. The computing system of claim 12 wherein the question-based feature is a question post feature.

16. The computing system of claim 15 wherein the question post feature contains terms of the body of the post containing the question.

17. The computing system of claim 12 wherein a feature of the discussion thread is a clickthrough feature.

18. A method for ranking discussion threads of a question-and-answer forum, each discussion thread having a question post and a plurality of answer posts, the method comprising:
providing a query;
receiving a query that includes terms;
for each of a plurality of discussion threads,
identifying features of the discussion thread, the features including a combined post feature representing a collection of terms from multiple answer posts of the plurality of answer posts of the discussion thread, a question feature representing a question of the discussion thread, a question post feature representing terms of a question post of the discussion thread, and one or more features selected from a group consisting of an answer feature, a popularity feature, an authority feature, an importance feature, an internal clickthrough feature, and an external clickthrough feature;
generating a feature score for each of the identified features; and
generating a relevance score for the discussion thread based on a weighted combination of the feature scores for the discussion thread wherein the relevance score for the discussion thread is an overall score representing relevance of the discussion thread to the query; and
ranking the discussion threads based on the overall scores of the discussion threads.

19. The computer-readable storage medium of claim 1 wherein the collection of terms includes terms from multiple answer posts of the discussion thread.

20. The computer-readable storage medium of claim 1 wherein the collection of terms includes terms from all the answer posts of the discussion thread.

21. The computer-readable storage medium of claim 1 wherein the computer-executable instructions further comprise a component that ranks a plurality of discussion threads based on their relevance scores.

22. The computer-readable storage medium of claim 21 wherein the computer-executable instructions further comprise a component that presents the ranking of the plurality of discussion threads.

23. The computing system of claim 12 wherein the computer-executable instructions further comprise instructions that rank a plurality of discussion threads based on their relevance scores and provide the ranking of the plurality of discussion threads.

24. The method of claim 18 further comprising outputting an indication of the ranking of the discussion threads.

\* \* \* \* \*